United States Patent
Jo et al.

(10) Patent No.: US 10,477,545 B2
(45) Date of Patent: Nov. 12, 2019

(54) METHOD AND APPARATUS FOR COMMUNICATION BETWEEN DEVICES IN WIRELESS COMMUNICATION SYSTEM

(71) Applicant: Samsung Electronics Co., Ltd., Suwon-si, Gyeonggi-do (KR)

(72) Inventors: Ohyun Jo, Seoul (KR); Won-Bin Hong, Seoul (KR); Hyun-Moo Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/399,171

(22) Filed: Apr. 30, 2019

(65) Prior Publication Data

US 2019/0261365 A1 Aug. 22, 2019

Related U.S. Application Data

(63) Continuation of application No. 15/514,274, filed as application No. PCT/KR2015/009986 on Sep. 23, 2015, now Pat. No. 10,334,592.

(30) Foreign Application Priority Data

Sep. 24, 2014 (KR) .................. 10-2014-0127709

(51) Int. Cl.
*H04W 72/04* (2009.01)
*H04L 29/08* (2006.01)
(Continued)

(52) U.S. Cl.
CPC ....... *H04W 72/0446* (2013.01); *H04L 5/0055* (2013.01); *H04L 67/12* (2013.01);
(Continued)

(58) Field of Classification Search
CPC ........ H04L 5/0055; H04L 67/12; H04W 4/70; H04W 4/80; H04W 72/04; H04W 72/0446; H04W 74/08; Y02D 70/00
See application file for complete search history.

(56) References Cited

U.S. PATENT DOCUMENTS

D690,678 S   10/2013  Daniel
2007/0275746 A1*  11/2007  Bitran .................. H04W 16/14
                                                    455/509
(Continued)

FOREIGN PATENT DOCUMENTS

KR   10-2014-0059220 A   5/2014

OTHER PUBLICATIONS

IEE Computer Society, IEE STD 80211, Part 11 Wireless LAN Medium Access Control (MAC) and Physical Layer (PHY) Specifications, Revision of IEE Std 802.11-2007, Mar. 29, 2012, New York, USA.

(Continued)

*Primary Examiner* — Kashif Siddiqui
(74) *Attorney, Agent, or Firm* — Jefferson IP Law, LLP

(57) ABSTRACT

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. The present disclosure relates to a method and an apparatus for communication between devices in a wireless communication system, the method for communication of a terminal in a wireless communication system comprises the steps of: determining a resource section for communication between the terminal and an auxiliary device positioned within a critical distance; and performing the communica- (Continued)

tion with the auxiliary device using the determined resource section, wherein the resource section may comprise at least one from among a waiting section which is unused for communication between terminals, a channel section which is occupied by another terminal, and a channel section which is occupied by a channel occupation request signal of the terminal.

20 Claims, 20 Drawing Sheets

(51) Int. Cl.
| | |
|---|---|
| *H04L 5/00* | (2006.01) |
| *H04W 4/70* | (2018.01) |
| *H04W 4/80* | (2018.01) |
| *H04W 74/08* | (2009.01) |

(52) U.S. Cl.
CPC ............... *H04W 4/70* (2018.02); *H04W 4/80* (2018.02); *H04W 72/04* (2013.01); *H04W 74/08* (2013.01); *Y02D 70/00* (2018.01)

(56) References Cited

U.S. PATENT DOCUMENTS

| | | | |
|---|---|---|---|
| 2010/0322183 A1* | 12/2010 | Iwamatsu | H04W 72/048 370/330 |
| 2013/0051318 A1 | 2/2013 | Matsuo et al. | |
| 2013/0065529 A1 | 3/2013 | Watanabe | |
| 2013/0286976 A1 | 10/2013 | Chang et al. | |
| 2014/0226639 A1 | 8/2014 | Yi et al. | |

OTHER PUBLICATIONS

EP Office Action dated Jan. 29, 2019 issued in EP Application No. 15843957.0.

\* cited by examiner

| 530 | 532 | 534 | 536-1 | 538-1 | 540-1 | 536-2 | 538-2 | 540-2 | |
|---|---|---|---|---|---|---|---|---|---|
| Element ID | Length | Number of allocations | Time offset #1 | Cover interval duration #1 | Direction info. #1 | Time offset #2 | Cover interval duration #2 | Direction info. #2 | ... |

FIG.5D

METHOD AND APPARATUS FOR COMMUNICATION BETWEEN DEVICES IN WIRELESS COMMUNICATION SYSTEM

CROSS-REFERENCE TO RELATED APPLICATION(S)

This application is a continuation application of prior application Ser. No. 15/514,274, filed on Mar. 24, 2017, which was the U.S. National Stage application under 35 U.S.C. § 371 of an International application number PCT/KR2015/009986, filed on Sep. 23, 2015, which is based on and claimed the benefit of a Korean patent application number 10-2014-0127709, filed on Sep. 24, 2014, the disclosure of which is incorporated by reference herein in its entirety.

BACKGROUND

1. Field

The present disclosure relates to a method and an apparatus for communication between short-range devices in a wireless communication system.

2. Description of the Related Art

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

Typically, in a wireless communication system, a device may perform a discovery and association procedure, and may be connected to and may communicate with another unspecified device located at a short range. For example, a 802.11 standard provides a communication scheme between devices located at a short range by using a contention-based wireless channel access scheme through a discovery and association procedure. That is, a particular terminal may access a wireless channel through contention with other devices located in a neighboring area, and thereby may ensure time resources for transmitting/receiving data to/from another device located at a short range. However, this scheme is disadvantageous in that a device needs to perform contention with multiple devices in order to access a wireless channel and thus, cannot stably communicate with a particular device. For example, in a situation where a particular device needs to transmit high-capacity data having very high QoS requirements to another device, when multiple devices located adjacent to the particular device desire to access a wireless channel, limited resources cause a ratio, at which the particular device is capable of using resources and other devices are capable of using resources, to become low. Accordingly, the particular device cannot seamlessly transmit high-capacity data to another device. The more the number of devices located at a short range becomes, the more remarkably the above-described degradation of the transmission performance of the device appears.

Accordingly, an embodiment of the present disclosure provides a method and an apparatus for stable communication between devices located at a short range in a wireless communication system.

Another embodiment of the present disclosure provides a method and an apparatus for causing a device to communicate with a particular predetermined device with low power in a wireless communication system.

Still another embodiment of the present disclosure provides a method and an apparatus for causing a device to communicate with other devices and a predetermined device by using one modem chip in a wireless communication system.

Yet another embodiment of the present disclosure provides a method and an apparatus for causing a device to determine resources for communicating with a particular predetermined device in a wireless communication system.

Still yet another embodiment of the present disclosure provides a method and an apparatus for causing a device to divide a communication period into a first period and a second period, to communicate with other unspecified devices during the first period, and to communicate with a particular predetermined device during the second period in a wireless communication system.

Further another embodiment of the present disclosure provides a method and an apparatus for designing an antenna in view of communication between particular devices and performing communication by using the designed antenna in a wireless communication system.

SUMMARY

In accordance with an aspect of the present disclosure, a communication method of a mobile station in a wireless communication system is provided. The communication method may include determining a resource period for communication between the mobile station and a particular device located within a threshold distance; and communicating with the particular device by using the determined resource period, wherein the resource period may include at least one of a stand-by period which is unused for communication between mobile stations, a channel period that another mobile station is occupying, and a channel period occupied by a channel occupation request signal from the mobile station.

In accordance with another aspect of the present disclosure, a communication apparatus of a mobile station in a wireless communication system is provided. The communication apparatus may include a controller configured to determine a resource period for communication between the mobile station and a particular device located within a threshold distance; and a communication unit configured to communicate with the particular device by using the determined resource period, wherein the resource period may include at least one of a stand-by period which is unused for communication between mobile stations, a channel period that another mobile station is occupying, and a channel period occupied by a channel occupation request signal from the mobile station.

In accordance with still another aspect of the present disclosure, a communication method of a device in a wireless communication system is provided. The communication method may include receiving, from a particular mobile station, resource period allocation information for allocating a resource period; and communicating with the particular mobile station during the allocated resource period, wherein the allocated resource period may include at least one of a stand-by period which is unused for communication between mobile stations, a channel period that another mobile station is occupying, and a channel period occupied by a channel occupation request signal from the mobile station.

In accordance with yet another aspect of the present disclosure, a communication apparatus of a device in a wireless communication system is provided. The communication apparatus may include a communication module configured to transmit/receive a signal to/from a particular mobile station; and a controller configured to receive resource period allocation information for allocating a resource period from the particular mobile station through the communication unit, and to perform a control operation for communicating with the particular mobile station during the allocated resource period, wherein the allocated resource period may include at least one of a stand-by period which is unused for communication between mobile stations, a channel period that another mobile station is occupying, and a channel period occupied by a channel occupation request signal from the mobile station.

In the present disclosure, in the wireless communication system, the device can communicate with the particular predetermined device with low power, and thereby can stably perform communication without interfering with a communication link of other devices located at a short range. Also, in the present disclosure, in the wireless communication system, the device can divide a communication period into a first period and a second period, can communicate with other unspecified devices during the first period, can communicate with a particular predetermined device during the second period, and thereby can communicate with a particular device while communicating with an unspecified device located at a short range by using one modem chip. Further, in the present disclosure, it is possible to obtain the effect that the device can communicate with a particular device located at a short range by using channel resources occupied by unspecified devices, and thereby can perform stable communication even when multiple devices desire to access a channel. Also, the present disclosure is advantageous in that overhead required to set a beam direction can be reduced by using an antenna designed in view of communication between particular devices.

BRIEF DESCRIPTION OF THE DRAWINGS

FIG. 5D is a view illustrating a structure of a resource allocation message transmitted from a mobile station to a cover according to an embodiment of the present disclosure;

DETAILED DESCRIPTION

Figure 1:
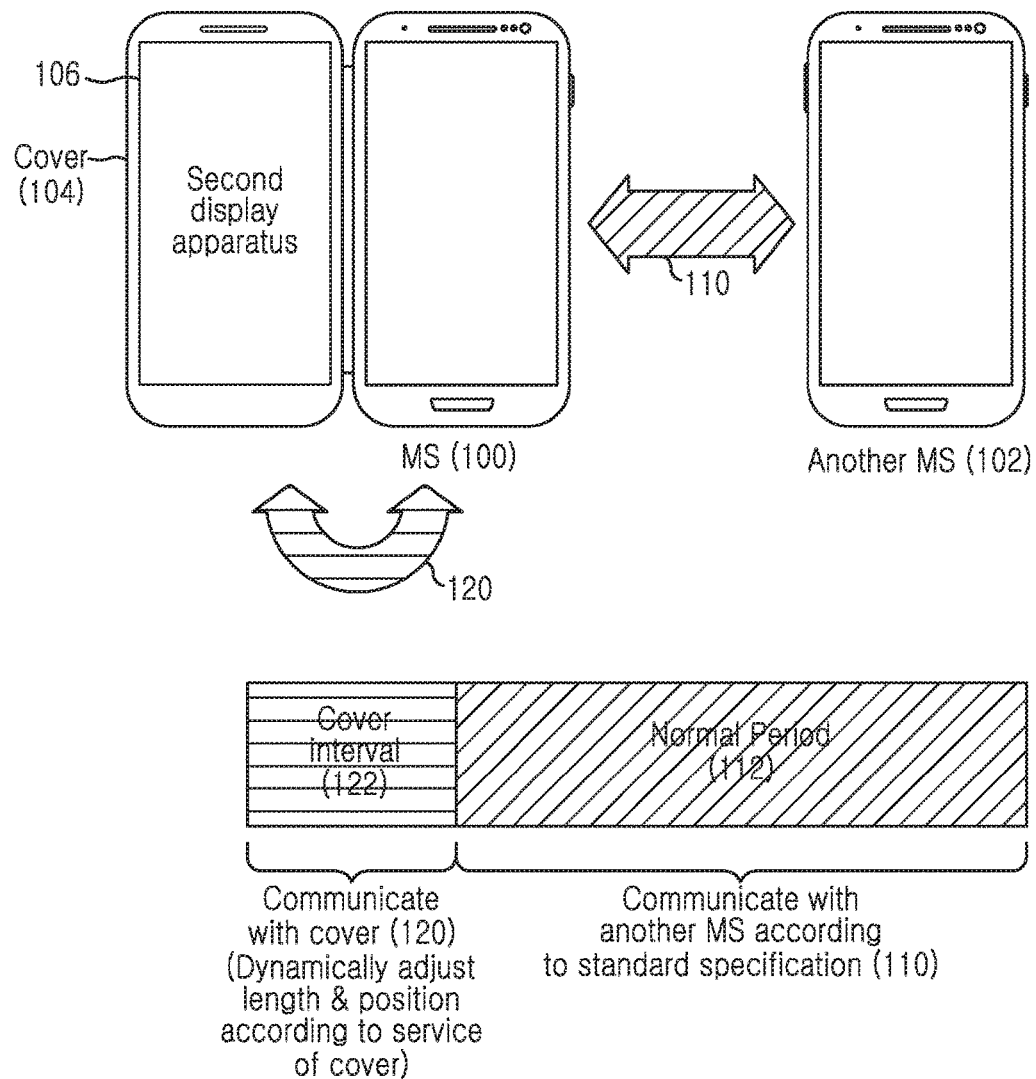
FIG. 1 is a view illustrating a scheme in which a mobile station communicates with another mobile station and a cover according to an embodiment of the present disclosure.

Hereinafter, exemplary embodiments of the present disclosure will be described with reference to the accompanying drawings. Also, in describing the present disclosure, a detailed description of related known configurations or functions incorporated herein will be omitted when it is determined that the detailed description thereof may unnecessarily obscure the subject matter of the present disclosure.

Further, terms described below are defined in view of functions in the present disclosure, and can be different depending on user and operator's intention or practice. Therefore, the terms should be defined based on the disclosure throughout this specification.

Hereinafter, some embodiments of this specification will be described in detail with reference to the exemplary drawings. It should be noted that in assigning reference numerals to elements in the drawings, the same reference numerals will designate the same elements where possible although they are shown in different drawings. Further, in the following description of embodiments of this specification, a detailed description of known functions and configurations incorporated herein will be omitted when it may make the subject matter of this specification rather unclear.

In addition, terms, such as first, second, A, B, (a), (b), and the like, may be used herein when describing elements of this specification. These terms are merely used to distinguish one structural element from other structural elements, and a property, an order, a sequence, and the like of a corresponding structural element are not limited by the term. It will be understood that when an element is described as being "connected", "linked", or "coupled" to another element, the element can be directly connected or coupled to said another element but can be indirectly "connected", "coupled", or "linked" to said another element via a third element.

A Mobile Station (MS) according to an embodiment of the present disclosure may be fixed or may have mobility, and may be referred to as a User Equipment (UE), a Mobile Terminal (MT), a User Terminal (UT), a Subscriber Station (SS), a wireless device, a Personal Digital Assistant (PDA), a wireless modem, a handheld device, a device, an electronic device, and the like.

Hereinafter, in the description of the present disclosure, a method and an apparatus for stable communication between MSs in a wireless communication system will be described. Particularly, in embodiments of the present disclosure, a method and an apparatus for causing MSs located at a short range to stably communicate with each other will be described. Hereinafter, for convenience of description, although communication between an MS and a cover is described as an example, the embodiments of the present disclosure as described below may be similarly applied to communication between an MS and another MS or communication between an MS and an accessory device (or auxiliary device). In embodiments of the present disclosure, a cover is one of accessory devices that are used together with a portable device at a location adjacent to the portable device, and may include a wireless communication module. According to an embodiment of the present disclosure, accessory devices such as a cover may include a wireless communication module, and may additionally include a display apparatus and a memory. The accessory devices may be a cover, a flip cover, a protection case, an electronic pen, a mobile phone ring, an earphone, an earcap, and the like.

FIG. 1 illustrates a scheme in which an MS communicates with another MS and a cover according to an embodiment of the present disclosure.

As illustrated in FIG. 1, the MS 100 communicates with another MS 102 on the basis of a standard specification during a normal period 112. For example, the MS 100 may discover another unspecified MS 102 around the MS 100 according to the 802.11 standard during the normal period 112, may be connected to another discovered MS 102, and may communicate (as indicated by reference numeral 110) with said another MS 102. Also, according to an embodiment of the present disclosure, the MS 100 may communicate (as indicated by reference numeral 120) with a cover 104 located within a short range during a cover interval 122. For example, the cover 104 may include a second display apparatus 106, and may display graphic data, which is received from the MS 100, on the second display apparatus 106. In this case, the cover 104 may serve as an additional display device for the MS 100. As another example, although not illustrated in FIG. 1, the cover 104 may include a memory, and may store data, which is received from the MS 100, in the memory. In this case, the cover 104 may serve as an additional memory for the MS 100.

In an embodiment of the present disclosure, consideration is given to a case where the cover 104 only communicates with the predetermined MS 100, and does not communicate with the MS 102 other than the predetermined MS 100. Also, the MS 100 and the cover 104 are located at a very short range therebetween. Accordingly, in an embodiment of the present disclosure, the MS 100 communicates with the cover 104 by using very small power, and thereby, the communication between the MS 100 and the cover 104 does not interfere with the communication of another MS 102. Here, power used for communication between the MS 100 and the cover 104 may be preset in a design phase through an experiment.

In an embodiment of the present disclosure, in order to keep communication between the MS 100 and the cover 104 from affecting communication of another MS 102, the cover 104 may be designed to configure a shielded space. For example, in order to keep an electrical signal exchanged for communication between the MS 100 and the cover 104 from escaping from the cover 104 and being delivered to the outside, the cover 104 may configure a shielded space for shielding an electrical signal. This configuration will be described in detail with reference to FIGS. 8A to 8C.

According to an embodiment of the present disclosure, the cover interval 122 is a period during which the MS 100 communicates with the cover 104, and, may be configured as a period which is unused for communication between MSs or communication between an MS and a base station, or may be configured as a period which is passively or actively determined according to a channel occupation situation. For example, the cover interval 122 may include a period which is unused for communication between MSs, or communication between an MS and an Access Point (AP) or a base station, such as an Inter-Frame Space (IFS), a Short Inter-Frame Space (SIFS), a Distributed Inter-Frame Space (DIFS), a guard time period, and the like. Here, the IFS signifies a time interval during which multiple MSs stand by in order to avoid a case where, in a wireless communication network, the multiple MSs simultaneously access a wireless channel and collide with each other. The SIFS signifies a minimum IFS. Also, the DIFS signifies a time interval during which the MS needs to stand by from a time point at which another MS has lastly used the AP when the MS accesses the AP. Further, the cover interval 122 may be configured as a channel period occupied by another MS, or may be configured as a channel period occupied by the transmission of a channel occupation signal by the MS 100. According to an embodiment of the present disclosure, the length and position of the cover interval 122 may be dynamically adjusted according to a service and a situation of a channel which are used by the cover.

Also, according to an embodiment of the present disclosure, when the MS 100 includes one communication modem, the MS 100 communicates with the cover 104 during a period corresponding to the cover interval 122, and thus, does not transmit/receive a packet to/from another neighboring MS. Accordingly, the MS 100 including the one communication modem may set an antenna beam direction so as to communicate with the cover 104 during the period corresponding to the cover interval 122, and may perform dedicated communication with the cover 104.

Figure 2:
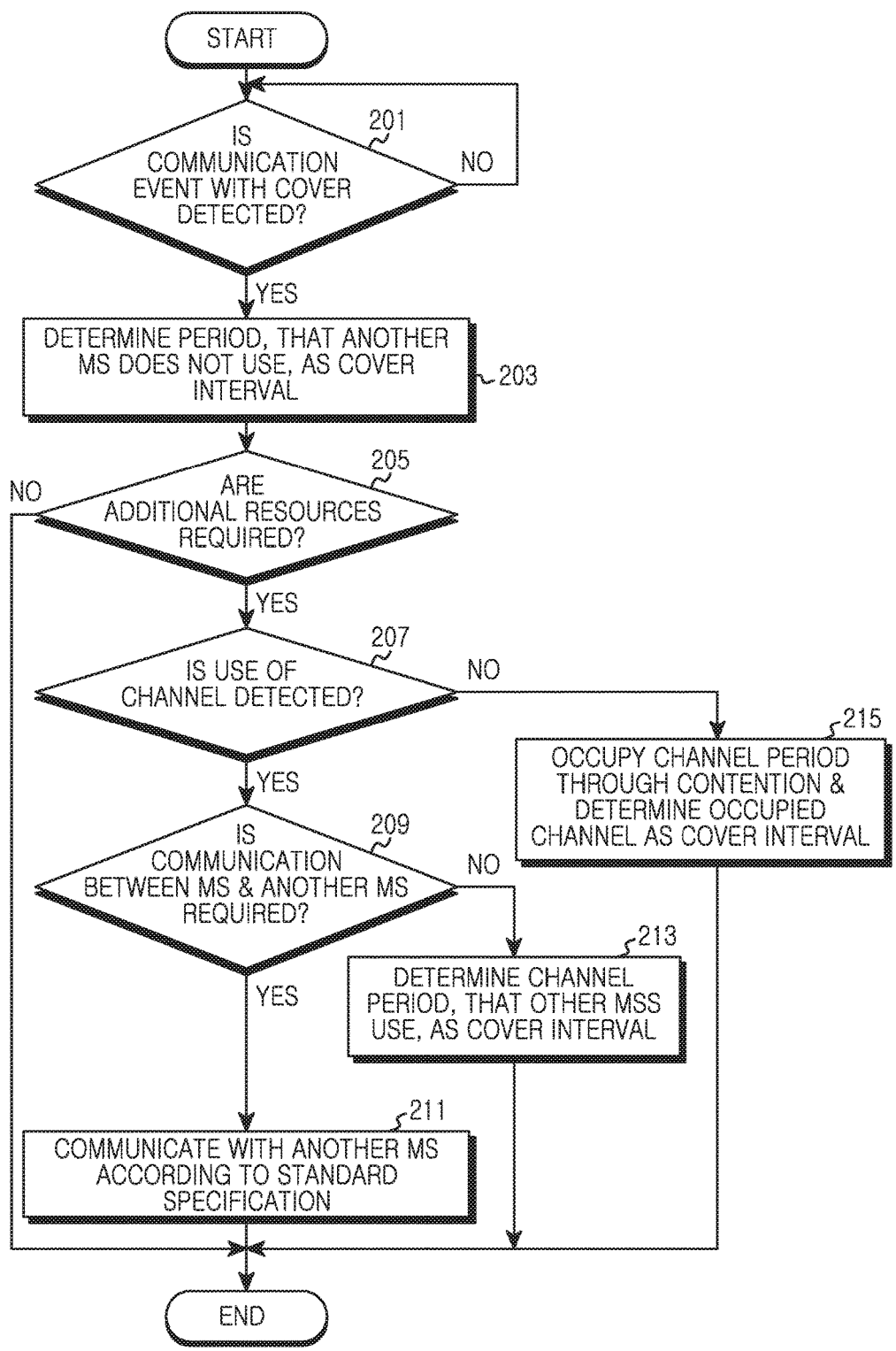
FIG. 2 is a view illustrating a procedure in which a mobile station determines communication resources between the mobile station and a cover according to an embodiment of the present disclosure.

FIG. 2 illustrates a procedure in which an MS determines communication resources between the MS and a cover according to an embodiment of the present disclosure.

Referring to FIG. 2, in step 201, the MS 100 checks whether a communication event with the cover 104 is detected. For example, the communication event with the cover 104 may be detected by a request of a user, the execution of a service which requires the communication with the cover 104, or the like. As a more specific example, in a case where the user makes a request for display by the second display apparatus 106 included in the cover 104, when an application is executed which performs a display through the second display apparatus 106 included in the cover 104, when the user makes a request for storage in the memory included in the cover 104, or when an application is executed which performs a storage in the memory included in the cover 104, the MS 100 may detect that a communication event with the cover 104 has occurred.

In step 203, the MS 100 determines a period, that another MS 102 does not use, as a cover interval. For example, the MS 100 may determine a time period (e.g., IFS, SIFS, DIFS, or guard time period), during which the MS stands by without performing communication, in addition to a communication period 110 of the MS defined by a standard specification, as a cover interval.

Then, in step 205, the MS 100 checks whether additional resources are required. That is, the MS 100 checks whether additional resources are required in addition to the cover interval determined in step 203 in order to communicate with the cover 104. For example, the MS 100 may determine whether the allocation of additional resources is required, on the basis of an application type which requests communication with the cover 104, the amount of data to be transmitted/received to/from the cover 104, the length of the cover interval, whether data to be transmitted/received to/from the cover 104 is likely to be delayed, and the like. When it is determined that the additional resources are not required, the MS 100 terminates the communication resource determination procedure according to an embodiment of the present disclosure.

Meanwhile, when it is determined that the additional resources are required, in step 207, the MS 100 monitors a channel, and determines whether the use of the channel is detected. For example, the MS 100 monitors a channel and checks whether a packet is received from another MS 102. At this time, when the packet is received from said another MS 102, the MS 100 may determine that the channel is being used. When the packet is not received from said another MS 102, the MS 100 may determine that an MS which is using the channel does not exist.

When it is determined that the channel is being used, the MS 100 proceeds to step 209 and checks whether a situation requires communication between the MS 100 and said another MS 102. For example, the MS 100 acquires a destination address of the packet from a header of the relevant packet received from said another MS 102, and determines whether a destination of the relevant packet is the MS 100 itself or still another MS, on the basis of the acquired destination address. When the destination address included in the received packet is identical to an address of the MS 100 itself, the MS 100 may determine that a situation requires communication between the MS 100 and said another MS 102 that has transmitted the received packet. In contrast, when the destination address included in the received packet is different from the address of the MS 100 itself, the MS 100 may detect a situation of communication between said another MS 102 and still another MS, and may determine that the situation does not require the communication between the MS 100 and said another MS 102.

When the situation requires the communication between the MS 100 and said another MS 102, in step 211, the MS 100 communicates with said another MS 102 according to a standard specification, and terminates the communication resource determination procedure according to an embodiment of the present disclosure. Thereafter, the MS 100 may again perform a communication resource determination procedure according to an embodiment of the present disclosure. Here, in a situation where a communication event with the cover 104 is detected, when a situation requiring the communication between the MS 100 and said another MS 102 is detected, the MS 100 may first perform communication, which has a higher priority, according to a preset priority. For example, the MS 100 may perform a control operation for first communicating with said another MS 102 and communicating with the cover 104 after the communication with said another MS 102 is terminated. As another example, the MS 100 may perform a control operation for first communicating with the cover 104 and communicating with said another MS 102. At this time, the MS 100 may cause the display apparatus to provide a user interface that requests a setting of whether the MS 100 is to first communicate with one of the cover 104 and said another MS 102. Also, the MS 100 may display a message or graphic data which indicates that the execution of communication with a particular device causes communication with another device to be delayed.

Meanwhile, when it is determined as a result of the checking in step 207 that the channel is not being used, the MS 100 proceeds to step 215 in which the MS 100 occupies a channel period through contention and determines the occupied channel as a cover interval. For example, the MS 100 may transmit, to other neighboring MSs, Ready To Send (RTS)/Clear To Send (CTS) or self-CTS for occupying a channel, and may occupy a channel period for communicating with the cover 104. Here, the RTS signal is a signal which notifies a reception-side MS that the MS desires to transmit data, and the CTS signal is a signal which allows the MS, that has received the RTS signal, to transmi data to a transmission-side MS. Also, the self-CTS signal signifies a signal that the MS, that has not received the RTS signal, transmits to neighboring MSs in order to occupy a channel. The MS 100 according to an embodiment of the present disclosure may include information on a required channel resource period in RTS or self-CTS, and may occupy the relevant channel resources. The MS 100 determines the cover interval, and then terminates the communication resource determination procedure according to an embodiment of the present disclosure.

Meanwhile, when a result of the checking in step 209 shows that a situation does not require the communication beteeen the MS 100 and said another MS 102, in step 213, the MS 100 determines a channel period, that other MSs use, as a cover interval. For example, the MS 100 may confirm channel occupation resources of other MSs from a received packet for communicating with the relevant other MSs, and may determine the confirmed channel occupation resources as a cover interval for communication between the MS and the cover. Here, the MS 100 may acquire information on a channel period, during which the relevant other MSs perform communication, from a channel occupation period field included in a header of the received packet, may set a timer corresponding to the acquired information on the channel period, and may determine an operating period of the timer as a cover interval. Here, the reason why channel resources (e.g., a time period) that the other MSs occupy is determined as a cover interval is because power for communication between the MS 100 and the cover 104 is small enough not to interfere with other neighboring MSs. The MS 100 determines the cover interval, and then terminates the communication resource determination procedure according to an embodiment of the present disclosure.

Figure 3:
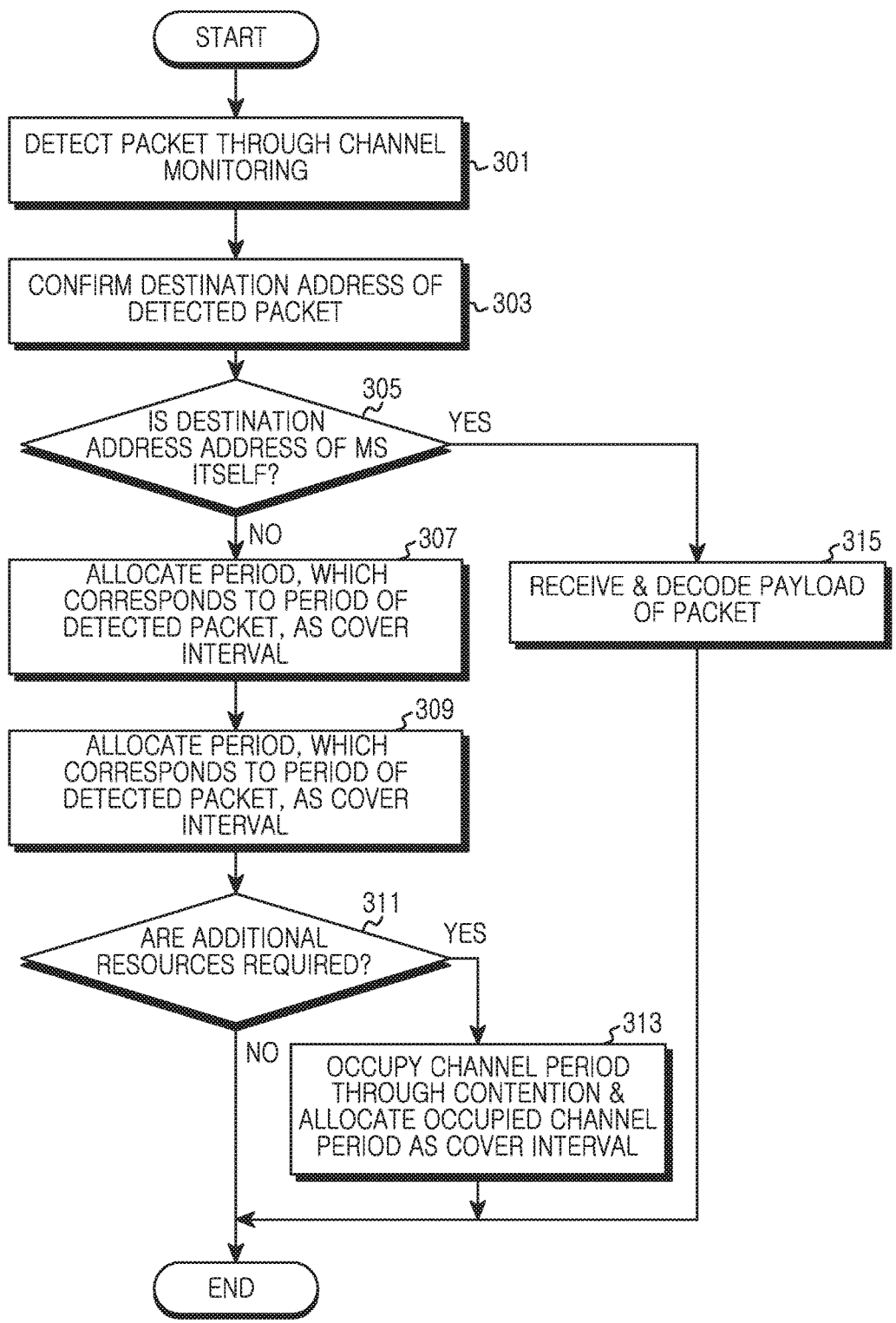
FIG. 3 is a view illustrating a procedure in which a mobile station passively determines communication resources through channel monitoring according to an embodiment of the present disclosure.

FIG. 3 illustrates a procedure in which an MS passively determines communication resources through channel monitoring according to an embodiment of the present disclosure.

As illustrated in FIG. 3, the MS 100 detects a packet through channel monitoring in step 301, and confirms a destination address of the packet detected through the channel monitoring in step 303. In step 305, the MS 100 checks whether the destination address of the detected packet is an address of the MS itself. When the destination address of the detected packet is the address of the MS itself, in step 315, the MS 100 receives a header of the packet, and then, continuously receives and decodes a payload of the packet. That is, when the destination address included in the header of the detected packet is identical to the adddress of the MS itself, the MS 100 may additionally receive a payload which follows the header of the relevant packet, and may communicate with said another MS 102, that has transmitted the relevant packet, according to a standard specification. Thereafter, the MS 100 terminates the passive communication resource determination procedure according to an embodiment of the present disclosure. Here, the MS, that has terminated the passive communication resource determination procedure, may again perform a passive communication resource determination procedure or may perform an active communication resource determination procedure.

In contrast, when the destination address of the detected packet is not the address of the MS itself, in step 307, the MS 100 allocates a period, which corresponds to a period of the detected packet, as a cover interval. For example, the MS 100 may confirm information on a channel period included in the header of the detected packet, and may determine the confirmed channel period as a cover interval. Here, since a result of monitoring the channel shows that a packet of which the destination is the MS 100 is not received, the MS 100 may recognize that a packet, that the MS 100 needs to receive from said another MS 102, does not exist during the relevant channel period. The MS 100 may perform data communication with the cover during the allocated cover interval, in step 309, and checks whether additional resources are required, in step 311. For example, the MS 100 may determine whether additional resources are required, on the basis of communication throughput between the MS 100 and the cover 104. Also, the MS 100 may determine whether a situation requires additional resources, on the basis of the amount of data transmitted/received between the MS 100 and the conver 104 and a period corresponding to the allocated cover interval. When it is determined that the additional resources are not required, the MS 100 terminates the passive communication resource determination procedure according to an embodiment of the present disclosure.

In contrast, when it is determined that the additional resources are required, the MS 100 proceeds to step 313 in which the MS 100 occupies a channel period through contention and allocates the occupied channel period as a cover interval. Here, a configuration in which the MS 100 occupies a channel period through contention and allocates the occupied channel period as a cover interval may be performed in a scheme similar to that of steps 403 to 405 of FIG. 4 below. Thereafter, the MS 100 terminates the passive communication resource determination procedure according to an embodiment of the present disclosure.

Figure 4:
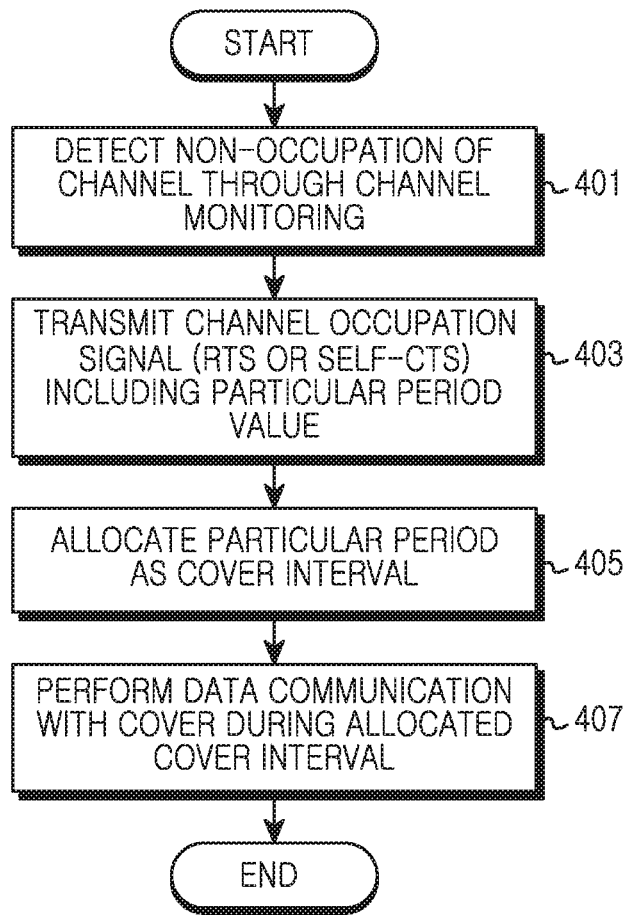
FIG. 4 is a view illustrating a procedure in which a mobile station actively determines communication resources through channel monitoring according to an embodiment of the present disclosure.

FIG. 4 illustrates a procedure in which an MS actively determines communication resources through channel monitoring according to an embodiment of the present disclosure.

Referring to FIG. 4, in step 401, the MS 100 detects a situation in which a channel is not occupied, through channel monitoring. For example, when no packet is received through channel monitoring, the MS 100 may confirm that another MS that is connected to a channel or desires to access the channel does not exist, and may determine that said another MS does not occupy the channel.

In step 403, the MS 100 transmits a channel occupation signal, which includes a particular period value, to other neighboring MSs. For example, the MS may transmit an RTS signal or a self-CTS signal, which includes information on a channel period to be used to communicate with the cover, to other neighboring MSs. The other neighboring MSs, that have received the RTS signal or the self-CTS signal from the MS 100, recognize that the relevant MS is performing communication during a relevant channel period, and do not attempt to communicate with the MS during the relevant channel period.

Thereafter, the MS 100 proceeds to step 405, and allocates a particular period, which corresponds to the particular period value included in the channel occupation signal, as a cover interval. Then, the MS 100 proceeds to step 407 in which the MS 100 performs data communication with the cover 104 during a period corresponding to the allocated cover interval. Then, the MS 100 terminates the active communication resource determination procedure according to an embodiment of the present disclosure.

Figure 5A:
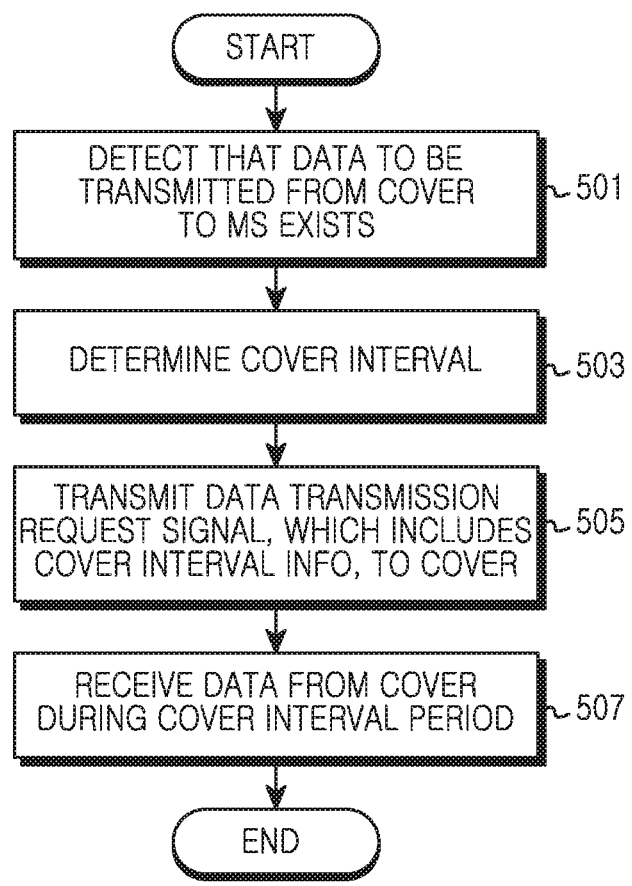
FIG. 5A is a view illustrating a procedure in which a mobile station communicates with a cover according to an embodiment of the present disclosure.

FIG. 5A illustrates a procedure in which an MS communicates with a cover according to an embodiment of the present disclosure.

Referring to FIG. 5A, the MS 100 detects that data to be transmitted from the cover 104 to the MS 100 exists in step 501, and determines a cover interval in step 503. For example, the cover 104 according to an embodiment of the present disclosure communicates with only a predetermined MS or an MS located within a threshold distance, and thus has difficulty in autonomously acquiring resources. Accordingly, in an embodiment of the present disclosure, the MS 100 detects a case where data to be transmitted from the cover 104 to the MS 100 exists, and determines a cover interval for communicating with the cover 104. For example, at a preset time point or when a particular application is executed, the MS 100 may detect a particular event or may receive a request signal from the cover 104 during a preset period, and may confirm that data to be transmitted from the cover 104 to the MS 100 exists. Also, as illustrated in FIGS. 2 to 4, the MS 100 may determine a period, that said another MS 102 does not use, as a cover interval, or may determine a cover interval on the basis of a passive communication resource determination scheme or an active communication resource determination scheme.

In step 505, the MS 100 transmits a data transmission request signal, which includes cover interval information, to the cover 104. According to an embodiment of the present disclosure, the data transmission request signal including cover interval information may be configured as illustrated in FIG. 5D. For example, the data transmission request signal including cover interval information may include element identification information (element ID) 530 representing cover identification information, length information 532 of a message, the number of allocated cover intervals (number of allocations) 534, time offsets (time offset #N) 536-1 and 536-2 representing start points of respective cover intervals, periods (cover interval duration #N) 538-1 and 538-2 of the respective cover intervals, and pieces of transmission direction information (direction info #N) 540-1 and 540-2 of the respective cover intervals. Here, when a cover interval period is not continuous and includes divided time periods, the number of allocated cover intervals may represent the number of the divided time periods. For example, when cover intervals are a period of 0 to 5 seconds, a period of 30 to 40 seconds, a period of 45 to 50 seconds, the number of cover intervals may be represented as being three. Also, a time offset, an interval period, and transmission direction information signifies information may be repeatedly included by the number of cover intervals. Further, here, the transmission direction information signifies information which indicates a period during which the MS 100 transmits a signal to the cover 104 or a period during which the cover 104 transmits a signal to the MS 100.

Thereafter, in step 507, the MS 100 receives data from the cover 104 during the cover interval period. Then, the MS 100 may terminate the communication procedure with the cover according to an embodiment of the present disclosure.

Figure 5B:
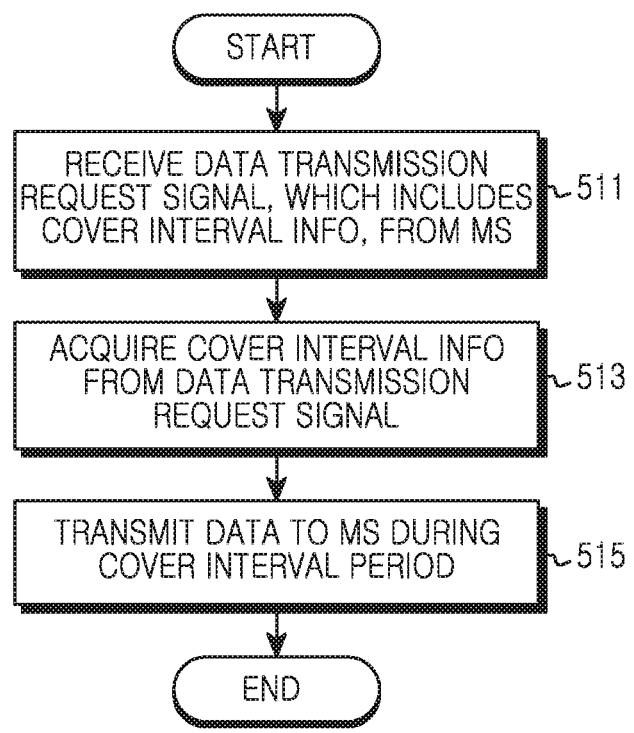
FIG. 5B is a view illustrating a procedure in which a cover communicates with a mobile station according to an embodiment of the present disclosure.

FIG. 5B illustrates a procedure in which a cover communicates with an MS according to an embodiment of the present disclosure.

Referring to FIG. 5B, in step 511, the cover 104 receives a data transmission request signal, which includes cover interval information, from the MS 100. According to an embodiment of the present disclosure, the data transmission request signal may be configured as illustrated in FIG. 5D. Thereafter, the cover 104 acquires the cover interval information from the data transmission request signal in step 513, and transmits data to the MS 100 during a cover interval period in step 515.

Figure 5C:
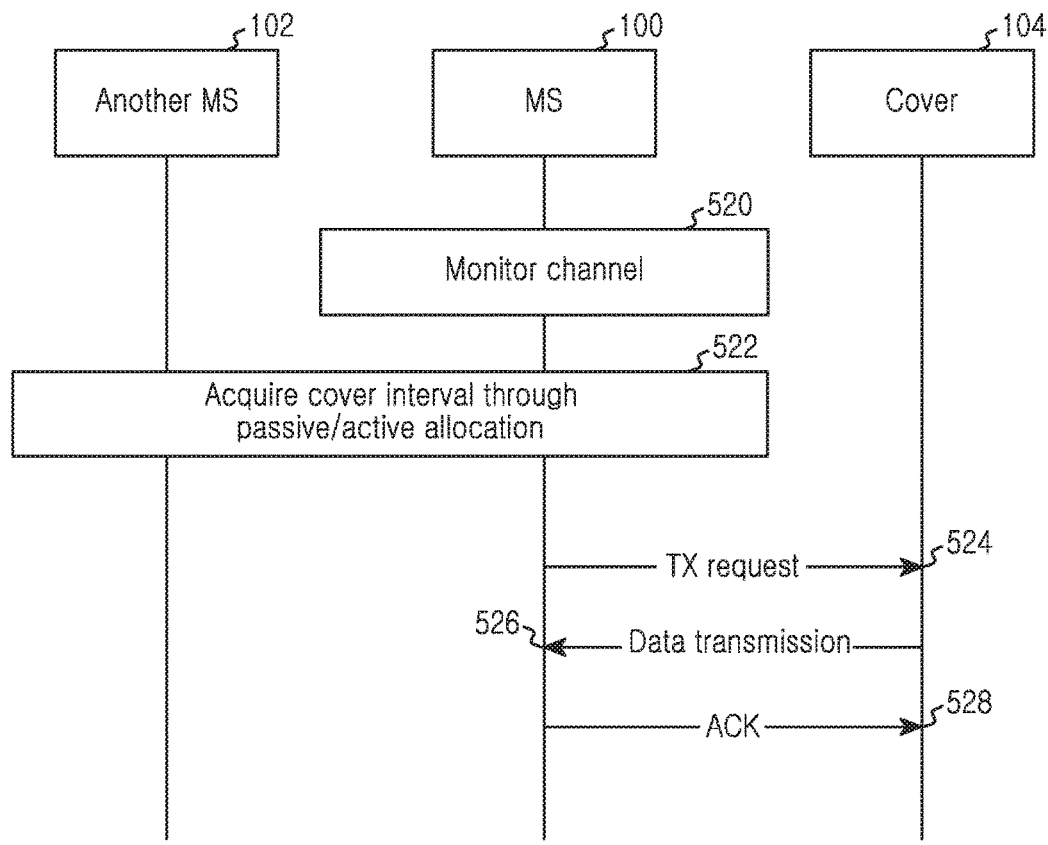
FIG. 5C is a view illustrating a communication procedure between a mobile station and a cover according to an embodiment of the present disclosure.

FIG. 5C illustrates a communication procedure between an MS and a cover according to an embodiment of the present disclosure.

Referring to FIG. 5C, the MS 100 detects the existence of data that the cover 104 is to transmit to the MS 100, and monitors a channel in order to allocate a cover interval in step 520. Then, in step 522, the MS 100 acquires cover interval information through passive resource allocation or active resource allocation on the basis of a result of monitoring the channel. For example, the MS 100 may confirm a channel period used for communication between said another MS 102 and still another MS, from a packet that said another MS 102 located adjacent to the MS 100 has transmitted, and may allocate the confirmed channel period as a cover interval. As another example, when the MS 100 does not receive a packet from said another MS 102 located adjacent to the MS 100, the MS 100 may detect that an MS that occupies a channel does not exist, may transmit an RTS or self-CTS signal and may occupy a channel period, and may allocate the occupied channel period as a cover interval.

Then, in step 524, the MS 100 may transmit a data transmission request signal, which includes cover interval information, to the cover 104. According to an embodiment of the present disclosure, the data transmission request signal including cover interval information may be configured as illustrated in FIG. 5D. Thereafter, the MS 100 may receive data from the cover 104 during a cover interval period in step 526, and may transmit an ACK message, which notifies of the successful reception of the data, to the cover 104 in step 528.

The description has been made in view of the case where the cover 104 transmits data to the MS 100 with reference to FIGS. 5A to 5D. However, the above-described embodiment of the present disclosure may be similarly applied to a case where the MS 100 transmits data to the cover 104. For example, when the MS 100 desires to transmit data to the cover 104, the MS 100 may monitor a channel and may acquire a cover interval, and may transmit information on the cover interval to the cover 104.

Also, the acquisition of a cover interval through channel monitoring has been described with reference to FIGS. 5A to 5D. However, the MS 100 may determine a period (e.g., IFS, SIFS, DIFS, guard time period, or the like), that said another MS 102 does not use for communication, as a cover interval without monitoring a channel, and may transmit information on the determined cover interval to the cover 104.

Figure 6A:
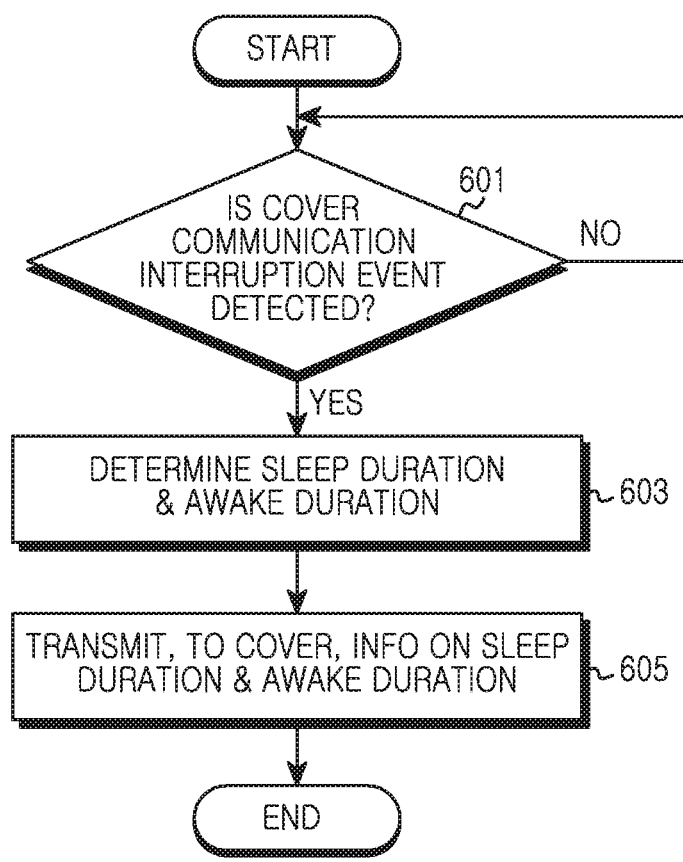
FIG. 6A is a view illustrating a procedure in which a mobile station changes a communication state of a cover according to an embodiment of the present disclosure.

FIG. 6A illustrates a procedure in which an MS changes a communication state of a cover according to an embodiment of the present disclosure.

Referring to FIG. 6A, in step 601, the MS 100 checks whether a cover communication interruption event is detected. For example, the cover communication interruption event may be generated by a user input. For example, while the MS 100 reproduces an image through the display apparatus included in the cover, the MS 100 may detect the selection of a menu by a user, the execution of a gesture by the user, or the input of a touch by the user which are for interrupting communication between the MS 100 and the cover 104. As a specific example, the MS 100 may display a message which inquires of the user about whether the user is to interrupt the cover image reproduction as illustrated in FIG. 6D, or may display an icon for controlling (e.g., interrupting or restarting) the cover image reproduction, and may receive an input for interrupting the cover image reproduction from the user. As another example, the MS 100 may detect a cover communication interruption event on the basis of the battery residual quantity of the MS 100, the battery residual quantity of the cover 104, and whether data exists. As a specific example, when the battery residual quantity of the MS 100 or the battery residual quantity of the cover 104 is less than a threshold, the MS 100 may detect may detect the occurrence of the cover communication interruption event. Here, the MS 100 may receive information on battery residual quantity from the cover 104 while communicating with the cover 104, or may include a separate means that detects the battery residual quantity of the cover 104.

When the cover communication interruption event has been detected, the MS 100 proceeds to step 603 in which the MS 100 determines a sleep duration and an awake duration. Here, the sleep duration is a period during which a communication module of the cover 104 is turned off, and the awake duration is a period during which the communication module of the cover 104 is turned on. According to an embodiment of the present disclosure, the sleep duration and the awake duration may be predetermined. Then, in step 605, the MS 100 transmits, to the cover 104, information on the sleep duration and the awake duration. At this time, a signal for transmitting the information on the sleep duration and the awake duration may be configured as illustrated in FIG. 6C. For example, a message for transmitting the information on the sleep duration and the awake duration may include element identification information (element ID) 630 representing cover identification information, length information 632 of the relevant message, information on a sleeping duration 634 and an awake duration 636.

Figure 6B:
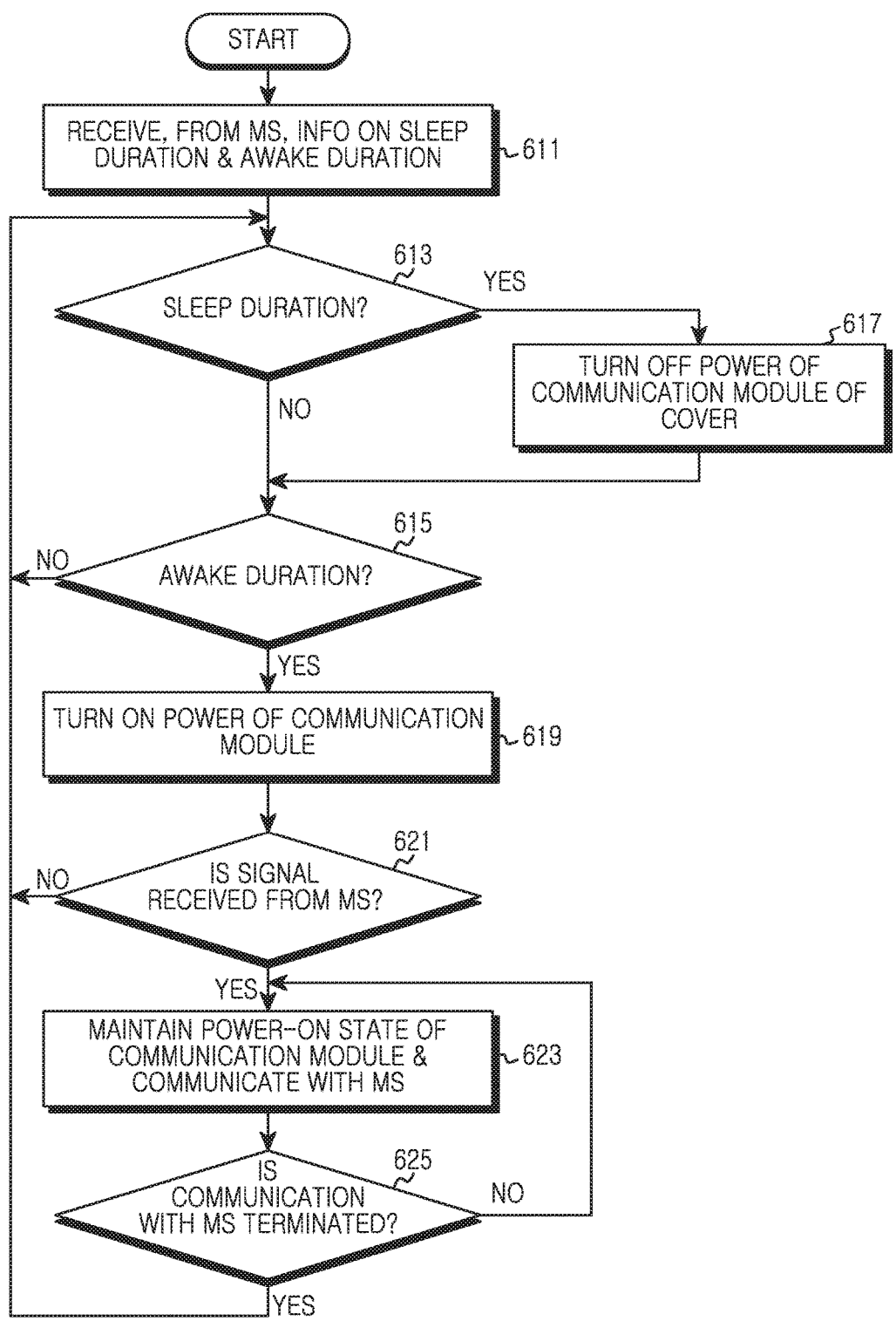
FIG. 6B is a view illustrating a procedure in which a cover changes a communication state according to the control of a mobile station according to an embodiment of the present disclosure.
Figure 6C:
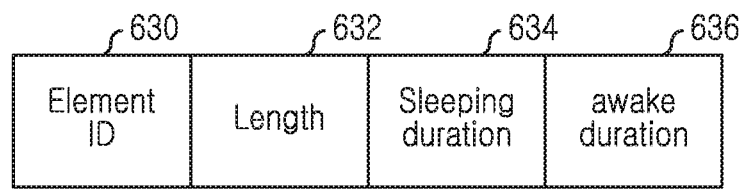
FIG. 6C is a view illustrating a structure of a communication state information message transmitted from a mobile station to a cover according to an embodiment of the present disclosure.
Figure 6D:
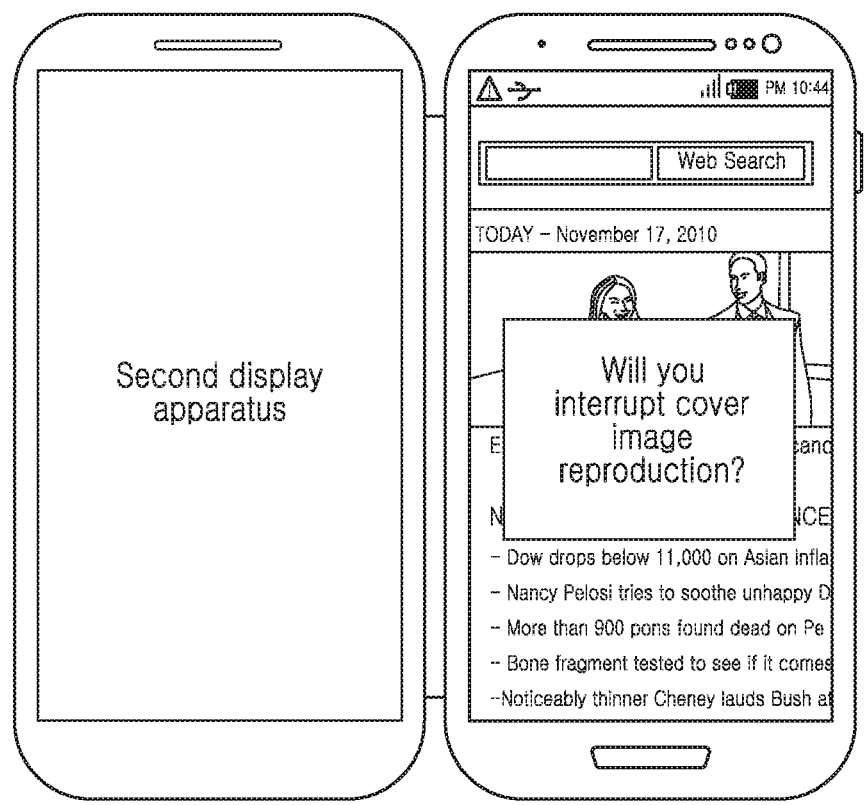
FIG. 6D is a view illustrating screen configurations of a mobile station and a cover according to an embodiment of the present disclosure.

FIG. 6B illustrates a procedure in which a cover changes a communication state according to the control of an MS according to an embodiment of the present disclosure.

Referring to FIG. 6B, in step 611, the cover 104 receives, from the MS 100, information on a sleep duration and an awake duration. For example, the cover 104 may receive a message illustrated in FIG. 6C, and may acquire information on a sleep duration and an awake duration, from the received message.

In step 613, the cover 104 determines whether a current time point corresponds to the sleep duration. When the current time point corresponds to the sleep duration, the cover 104 proceeds to step 617 in which the cover 104 turns off power of the communication module included in the cover 104, and performs step 615. For example, the cover 104 may determine that a signal is not received from the MS 100 during the sleep duration, and may turn off power of the communication module in order to reduce power consumption during the sleep duration.

In contrast, when the current time point does not correspond to the sleep duration, the cover 104 proceeds to step 615 in which the cover 104 checks whether the current time point corresponds to the awake duration. When the current time point does not correspond to the awake duration, the cover 104 returns to step 613 in which the cover 104 may re-check whether the current time point corresponds to the sleep duration.

When the current time point corresponds to the awake duration, the cover 104 proceeds to step 619 in which the cover 104 turns on power of the communication module included therein. For example, the cover 104 may determine that a signal is likely to be received from the MS 100 during the awake duration, and may turn on power of the communication module in order to detect the reception of a signal from the MS 100 during the awake duration.

Then, in step 621, the cover 104 checks whether a signal is received from the MS 100. When the signal is not received from the MS 100, the cover 104 returns to step 613, and again performs the steps after step 613. In contrast, when the signal is received from the MS 100, in step 623, the cover 104 may maintain the power-on state of the communication module and may communicate with the MS 100. At this time, the cover 104 may acquire cover interval information from the MS 100, and may transmit or receive data during a cover interval period.

In step 625, the cover 104 checks whether the communication with the MS 100 has been terminated. When the communication with the MS 100 has not been terminated, the cover 104 may return to step 623, and may again perform the steps after step 623. When the communication with the MS 100 has been terminated, the cover 104 may return to step 613, and may again perform the steps after step 613.

Figure 7A:
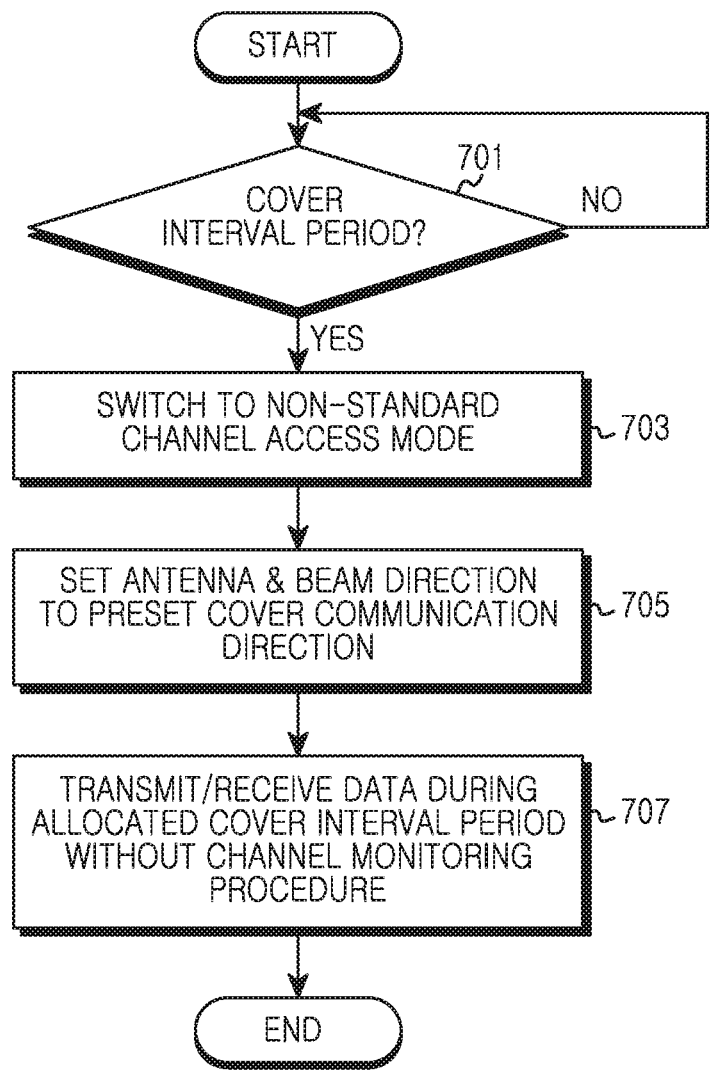
FIG. 7A is a view illustrating a procedure in which a mobile station communicates with a cover by using a particular predetermined beam direction according to an embodiment of the present disclosure.

FIG. 7A illustrates a procedure in which an MS communicates with a cover by using a particular predetermined beam direction according to an embodiment of the present disclosure.

Referring to FIG. 7A, in step 701, the MS 100 checks whether a current time point corresponds to a cover interval period. When the current time point corresponds to the cover interval period, in step 703, the MS 100 switches to a non-standard channel access mode. For example, the MS 100 may not switch to a mode for communicating with said another MS 102 according to a standard specification during the cover interval period, but may switch to a mode for communicating with the cover 104 according to a non-standard specification.

Figure 7B:
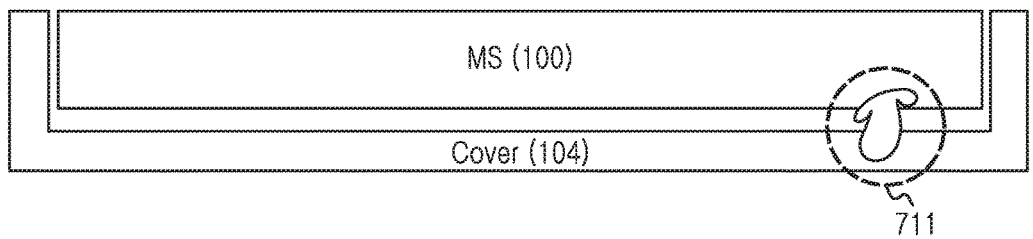
FIG. 7B is a view illustrating a beam direction between a mobile station and a cover according to an embodiment of the present disclosure.
Figure 7C:
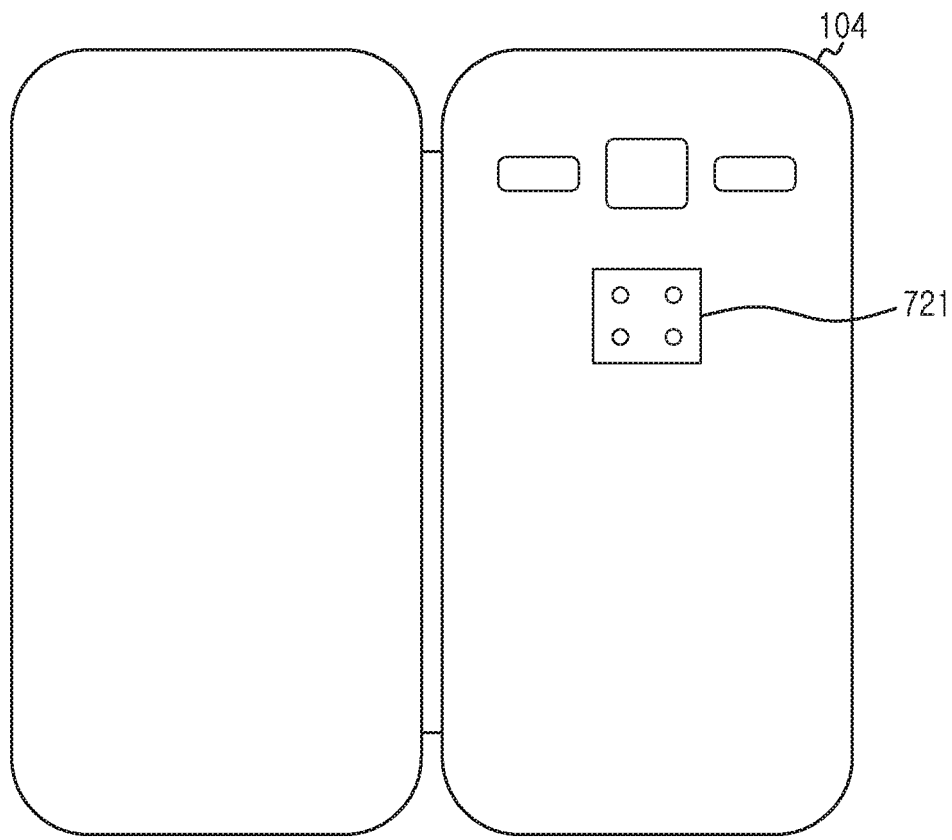
FIG. 7C is a view illustrating a cover with an antenna according to an embodiment of the present disclosure.

The MS 100 may set an antenna and beam direction to a preset cover communication direction in step 705, and may transmit/receive data during an allocated cover interval period without a channel monitoring procedure in step 707. For example, as illustrated in FIG. 7B, the MS 100 may set an antenna beam direction of the MS 100 so as to face a direction in which the cover 104 is located. As another example, as illustrated in FIG. 7C, the cover 104 may include an antenna 721 in an inner face that contacts a particular face of the MS 100. In this case, the MS 100 may set an antenna beam direction to the direction of the particular face which contacts the cover 104. Also, when the cover 104 includes the antenna 721 in the inner face that contacts the particular face of the MS 100 as illustrated in FIG. 7C, a rear face of the cover 104 may be designed to include an element that shields a radio wave, so as to radiate a radio wave from the antenna 721 to only the particular face of the MS 100. According to an embodiment of the present disclosure, the antenna beam direction of the MS 100 which faces a direction in which the cover 104 is located may be preset in a design stage in view of the antenna of the cover 104, or may be set on the basis of information previously acquired from the cover 104. Also, according to an embodiment of the present disclosure, an antenna beam direction of the cover 104 may be fixed so as to face a face, which contacts the MS 100, without being changed.

Figure 8A:
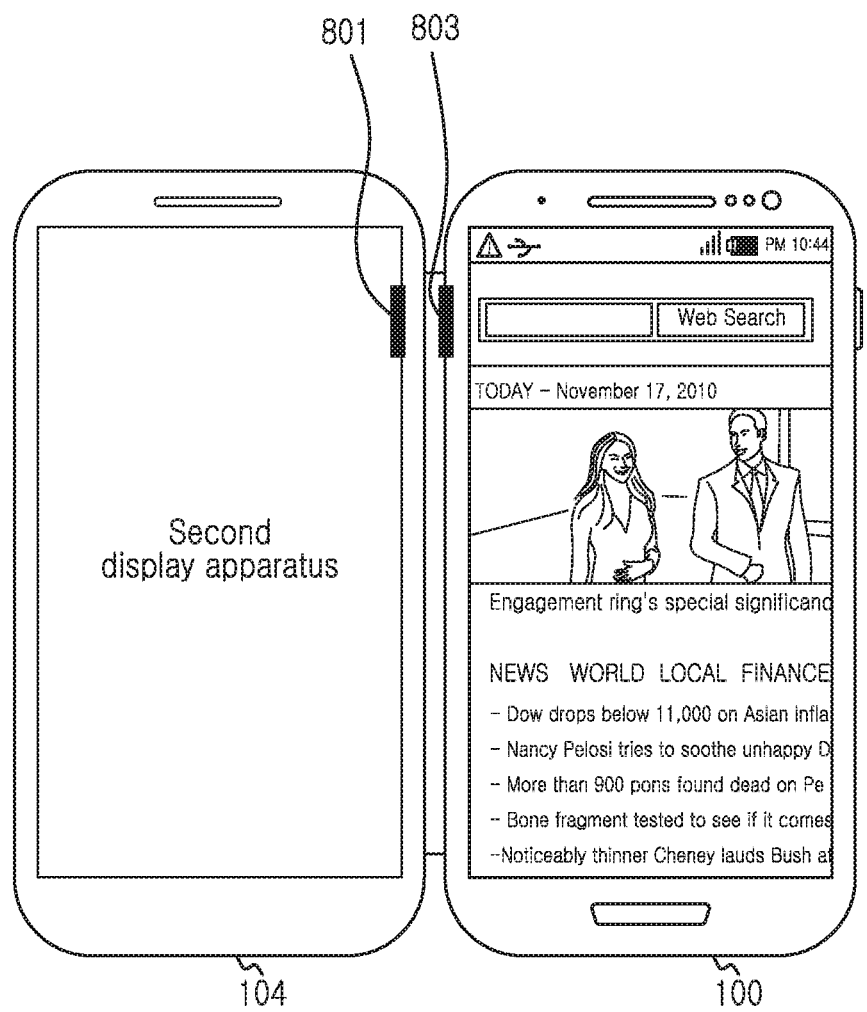
FIG. 8A is a view illustrating the installation position of an antenna of each of a mobile station and a cover according to an embodiment of the present disclosure.
Figure 8B:
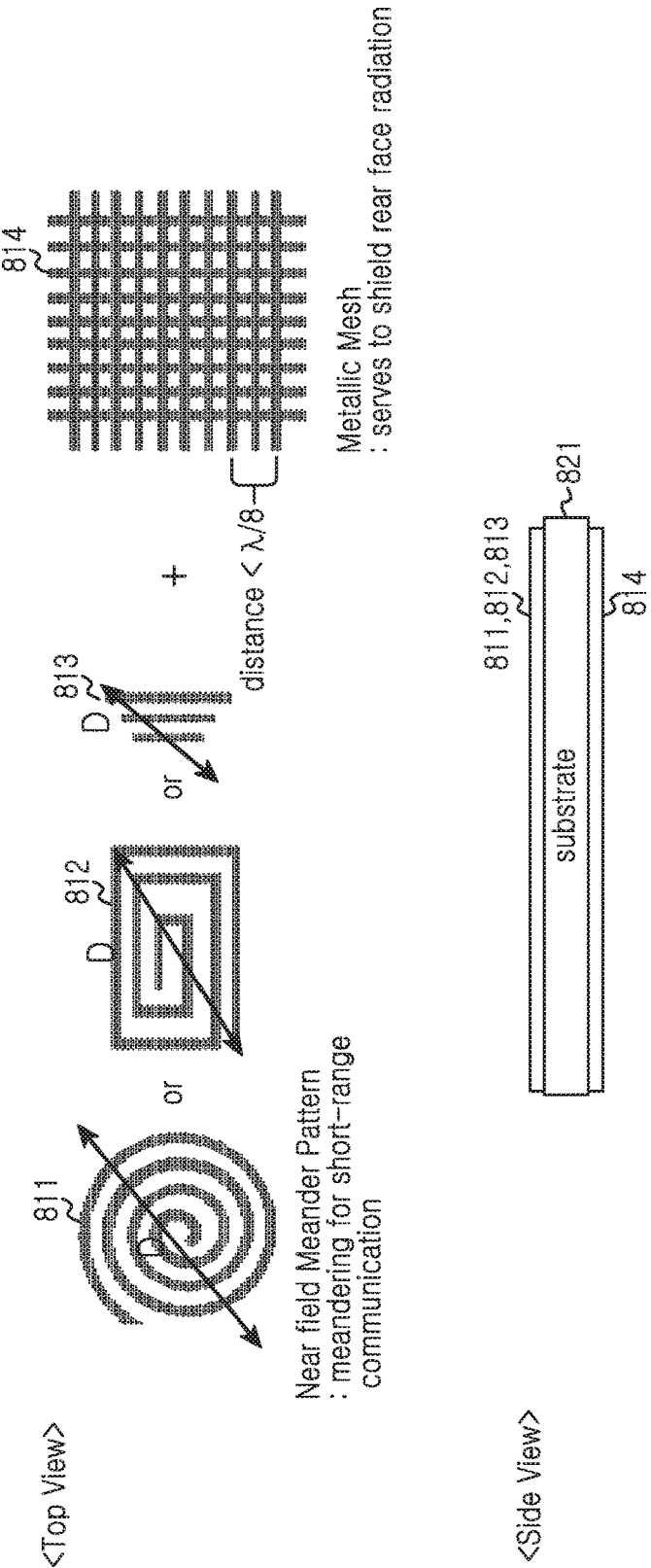
FIG. 8B is a view illustrating an example of a structure of an antenna of each of a mobile station and a cover according to an embodiment of the present disclosure.
Figure 8C:
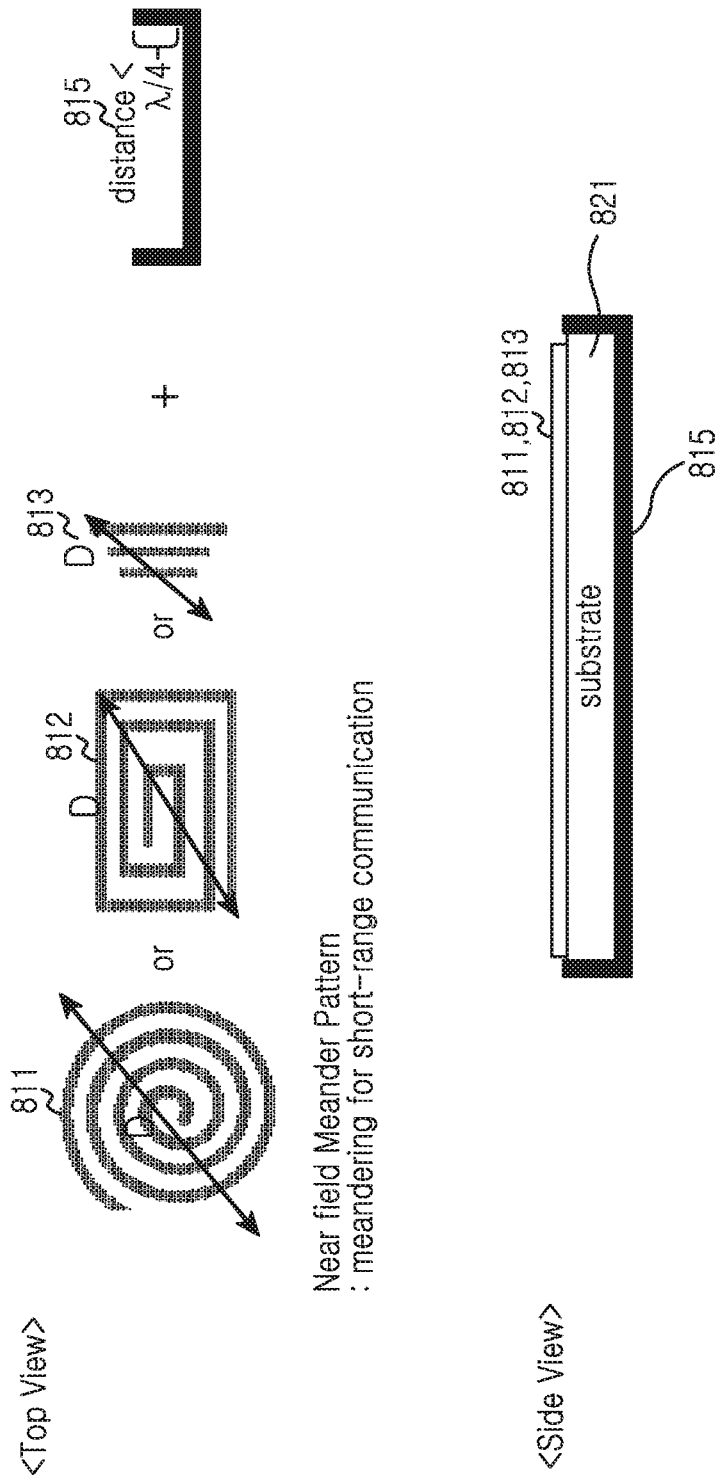
FIG. 8C is a view illustrating another example of a structure of an antenna of each of a mobile station and a cover according to an embodiment of the present disclosure.

FIG. 8A illustrates the installation position of an antenna of each of an MS and a cover according to an embodiment of the present disclosure. FIGS. 8B and 8C illustrate examples of a structure of the antenna of each of the MS and the cover according to an embodiment of the present disclosure.

FIGS. 8A to 8C illustrate an antenna design structure for minimizing an effect that a communication signal between the MS 100 and the cover 104 exerts on communication of other MSs.

According to an embodiment of the present disclosure, the antenna 801 of the cover 104 and the antenna 803 of the MS 100 may be installed at locations illustrated in FIG. 8A. That is, the antenna 801 of the cover 104 may be mounted at a location adjacent to the MS 100, and the antenna 803 of the MS 100 may be mounted at a location adjacent to the antenna 801 of the cover 104. At this time, the antenna 803 of the MS 100 may be a dedicated antenna for cover communication, or may be an antenna used for both the cover communication and communication with another MS.

Also, according to an embodiment of the present disclosure, an antenna for communication of each of the cover 104 and the MS 100 may include radiators 811, 812 and 813, and a shielding body 814 as illustrated in FIG. 8B, or may include the radiators 811, 812 and 813, and a cavity 815 as illustrated in FIG. 8C. The radiator according to an embodiment of the present disclosure may be configured in a meandering pattern, and the size of the radiator may be configured such that the maximum length of a polygon or a circle including the radiator satisfies Equation 1. Here, the polygon or circle including the radiator may include a partial area of a substrate 821.

Equation 1

$$D \ll \sqrt{\frac{\lambda P}{2}}$$

Here, D represents the maximum length of the polygon or circle including the radiator, λ represents the length of a wavelength according to a frequency, and P represents a distance between the antenna of the MS 100 and the antenna of the cover 104. For example, when the antenna of the MS 100 and the antenna of the cover 104 are designed as illustrated in FIG. 8A, P may represent a distance between the MS and the cover, and is conventionally equal to about 20 mm Equation 1 is for causing the antennas used for communication between the MS 100 and the cover 104 to operate in a near-field area. Here, the meandering pattern signifies that a conductive wire is bent and has a crank shape as in the first radiator 811 and the second radiator 812 illustrated in FIGS. 8B and 8C.

Also, as illustrated at the right of FIG. 8B, the shielding body 814 according to an embodiment of the present disclosure may be formed of a metallic material having a mesh structure. At this time, a distance between the metallic material elements due to the mesh structure may be designed to be shorter than λ/8. This configuration is for shielding a radio wave radiated from the radiator. As illustrated in FIG. 8B, according to an embodiment of the present disclosure, the antenna that includes the radiators 811, 812 and 813, and the shielding body 814 may include the substrate 821. For example, as illustrated in the side view of FIG. 8B, the radiators 811, 812, and 813 may be designed on one surface of the substrate 821, and the shielding body 814 may be designed on the other surface of the substrate 821.

Further, the cavity 815 according to an embodiment of the present disclosure may be formed of a conductive material as illustrated at the right of FIG. 8C. At this time, the height of the cavity 815 may be designed to be less than λ/4. Also, as illustrated in FIG. 8C, according to an embodiment of the present disclosure, the antenna that includes the radiators 811, 812, or 813, and the cavity 815 may include the substrate 821. For example, as illustrated in the side view of FIG. 8C, the radiators 811, 812, and 813 may be designed on one surface of the substrate 821, and the remaining three surfaces may be shielding-processed as the cavity 815.

Figure 9:
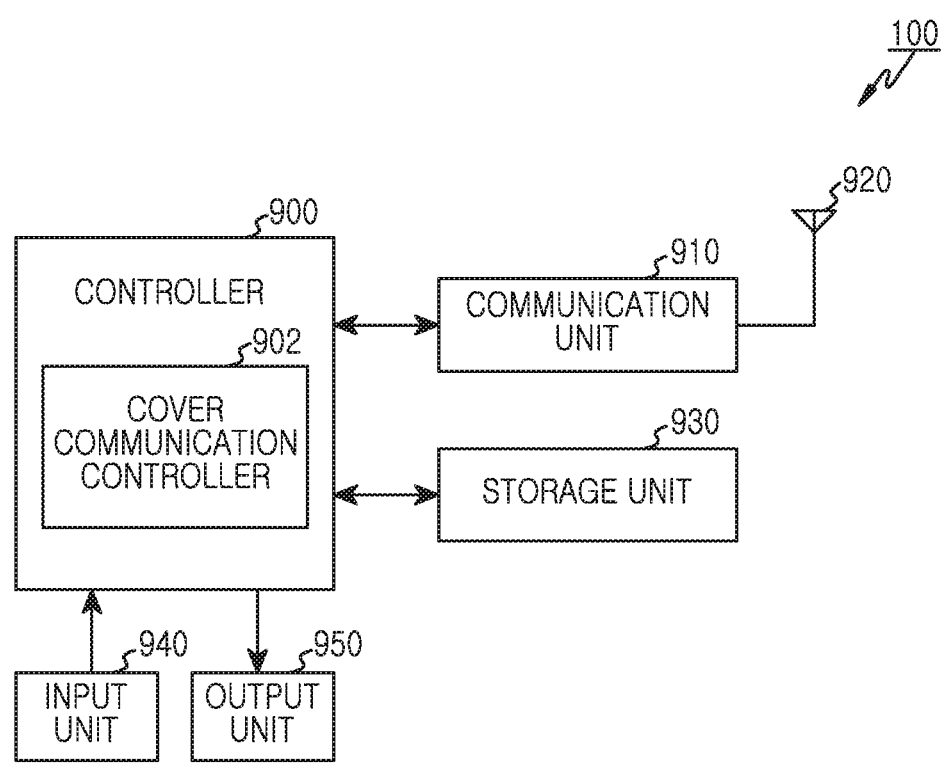
FIG. 9 is a view illustrating a block configuration of a mobile station according to an embodiment of the present disclosure.

FIG. 9 illustrates a block configuration of an MS according to an embodiment of the present disclosure.

Referring to FIG. 9, the MS 100 may include a controller 900, a communication unit 910, an antenna 920, a storage unit 930, an input unit 940, and an output unit 950.

The controller 900 controls and processes an overall function of operating the MS 100. For example, the controller 900 controls a function of communicating with another unspecified MS located around the MS 100, and controls and processes a function of communicating with a particular device such as the cover 104. For example, the controller 900 includes a cover communication controller 902; and determines a cover interval for communicating with the cover 104, and controls and processes a function of communicating with the cover 104 on the basis of the cover interval. The cover communication controller 902 may determine a period (e.g., IFS, SIFS, DIFS, or guard time period), that other MSs do not use, as a cover interval according to a standard specification, and may determine a channel period, that other MSs occupy, as a cover interval. Also, the cover communication controller 902 may occupy a channel period through the transmission of a signal for occupying a channel, and may determine the occupied channel period as a cover interval. Also, the cover communication controller 902 may control and process a function of transmitting information on the cover interval to the cover 104, may determine a sleep duration and an awake duration of the cover 104 in order to control a communication state of the cover 104, and may control and process a function of transmitting, to the cover 104, information on the determined sleep duration and awake duration. Further, the cover communication controller 902 controls and processes a function of adjusting the antenna 920 and/or a transmission/reception beam direction in order to communicate with the cover 104.

The communication unit 910 communicates with another MS, a base station, or the cover 104, that is located around the MS 100, according to the control of the controller 900. For example, the communication unit 910 may include one communication modem. Particularly, according to the control of the controller 900, the communication unit 910 may transmit/receive data to/from the cover 104 with preset low power during a cover interval. Also, the communication unit 910 may adjust the direction of the antenna 920 and/or a transmission/reception beam direction thereof in order to communicate with the cover 104 according to the control of the controller 900. According to an embodiment of the present disclosure, the antenna 920 may be a beam antenna or an antenna array that is capable of forming a beam in a particular beam direction. As another example, the antenna 920 may include the radiators 811, 812 and 813, and the shielding body 814 as illustrated in FIG. 8B, or may include the radiators 811, 812 and 813, and the cavity 815 as illustrated in FIG. 8C.

The storage unit 930 stores various data and programs for an overall operation of the MS 100. According to an embodiment of the present disclosure, the storage unit 930 may store information on a cover interval, and may store information on a sleep duration and an awake duration. Also, the storage unit 930 may include information on power used to communicate with the cover 104.

The input unit 940 delivers a command or data, which is generated by a selection or gesture made by a user, to the controller 900. For example, the input unit 940 may include at least one of at least one physical key button, a physical key pad, a touch detection sensor, a proximity sensor, an acceleration sensor, a microphone, and a mouse.

The output unit 950 may output picture data, image data, or voice data to the user. For example, the output unit 950 may include a display apparatus that displays picture data or image data, and a speaker that outputs voice data. The display apparatus according to an embodiment of the present disclosure may display a graphic element representing communication with the cover 104, or a graphic element representing the interruption of communication with the cover 104.

Figure 10:
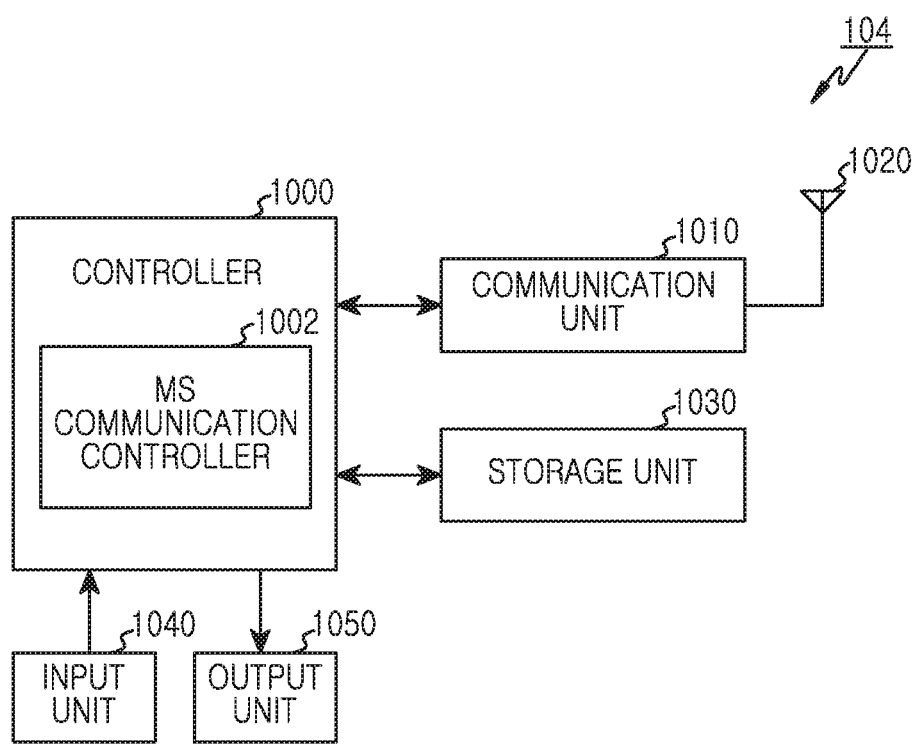
FIG. 10 is a view illustrating a block configuration of a cover according to an embodiment of the present disclosure.

FIG. 10 illustrates a block configuration of a cover according to an embodiment of the present disclosure.

Referring to FIG. 10, the cover 104 may include a controller 1000, a communication unit 1010, an antenna 1020, a storage unit 1030, an input unit 1040, and an output unit 1050.

The controller 1000 controls and processes an overall function of operating the cover 104. For example, the controller 1000 controls and processes a function of outputting data, which is received from the MS 100, through the output unit 1050, or a function of storing data, which is received from the MS 100, in the storage unit 1030. For example, an MS communication controller 1002 controls and processes a function of receiving, from the MS 100, cover interval information for communicating with the MS 100, and a function of communicating with the MS 100 on the basis of a cover interval. The MS communication controller 1002 controls a function of receiving, from the MS 100, information on a sleep duration and an awake duration of the cover 104, a function of turning off power of a communication module included in the communication unit 1010 during the sleep duration, and a function of turning on power of the communication module during the awake duration.

The communication unit 1010 communicates with the particular preset MS 100 according to the control of the controller 1000. For example, according to the control of the controller 1000, the communication unit 1010 may transmit/receive data to/from the particular MS 100 with preset low power during a cover interval.

The antenna 1020 may be a beam antenna or an antenna array that is capable of forming a beam in a particular beam direction. As another example, the antenna 1020 may include the radiators 811, 812 and 813, and the shielding body 814 as illustrated in FIG. 8B, or may include the radiators 811, 812 and 813, and the cavity 815 as illustrated in FIG. 8C.

The storage unit 1030 stores various data and programs for communicating with the MS 100. According to an embodiment of the present disclosure, the storage unit 1030 may store information on a cover interval, and may store information on a sleep duration and an awake duration. Also, the storage unit 1030 may include information on power used for communication between the cover 104 and the MS 100. Further, the storage unit 1030 may store data received from the MS 100.

The input unit 1040 delivers a command or data, which is generated by a selection or gesture made by the user, to the controller 1000. For example, the input unit 1040 may include at least one of at least one physical key button, a physical key pad, a touch detection sensor, a proximity sensor, an acceleration sensor, a microphone, and a mouse.

The output unit 1050 may output picture data, image data, or voice data to the user. For example, the output unit 1050 may include a display apparatus that displays picture data or image data, or a speaker that outputs voice data. The display apparatus according to an embodiment of the present disclosure may display a graphic element corresponding to data received from the MS 100.

Although the present disclosure has been described with reference to the limited embodiments and the drawings as described above, the present disclosure is not limited to the above-described embodiments, and those having ordinary knowledge in the technical field, to which the present disclosure pertains, will appreciate that various modifications and changes in form may be made from the description.

The operations according to embodiments of the present disclosure may be implemented by a single controller. In this case, program instructions for performing operations implemented by various computers may be recorded in a computer-readable medium. The computer-readable medium may include a program instruction, a data file, a data structure, and the like, alone or in a combination thereof. The program instructions may be especially designed and configured for the present disclosure, or may be known to and used by those skilled in the art. Examples of the computer-readable recording medium may include a magnetic medium such as a hard disk, a floppy disk, and a magnetic tape; an optical recording medium such as a Compact Disk Read Only Memory (CD-ROM) or a Digital Versatile Disk (DVD); a magneto-optical medium such as a floptical disk; and a hardware device specially configured to store and execute program instructions, such as a ROM, a Random Access Memory (RAM), a flash memory, and the like. Examples of the program instructions include a high-level language code, that a computer can execute by using an interpreter and the like, as well as a machine language code made by a compiler. When all or some of the base stations or relays as described in the present disclosure are implemented by a computer program, a computer-readable recording medium in which the computer program is stored also falls within the scope of the present disclosure. Therefore, the scope of the present disclosure should not be defined as being limited to the described embodiments, but should be defined by the appended claims and equivalents thereof.

What is claimed is:

1. A device comprising:
   at least one processor; and
   a transceiver configured to:
      perform a communication of data to a corresponding device, wherein the data is displayed on a display of the corresponding device during the communication;
      receive, during the communication, a user input to cease the communication; and
      transmit, to the corresponding device, information for controlling the corresponding device to cease the communication in response to the user input,
   wherein the displaying of the data by the corresponding device is ceased based on the information,
   wherein the corresponding device is in a form of a cover that is capable of being folded, and
   wherein the corresponding device comprises:
      a first surface on which the display of the corresponding device is disposed, and
      a second surface on which the device is mounted.

2. The device of claim 1, further comprising:
   a display configured to display an icon to control the displaying of the data by the corresponding device,
   wherein the at least one processor is further configured to receive the user input through the displayed icon.

3. The device of claim 1, wherein the at least one processor is further configured to:
   determine whether a remaining amount of battery of at least one of the device or the corresponding device is less than a threshold value, and
   transmit, to the corresponding device, information for controlling the corresponding device to cease the communication based on a determination that the remaining amount of battery of at least one of the device or the corresponding device is less than the threshold value.

4. The device of claim 1, wherein the corresponding device is within a distance from the device, the distance being shorter than a distance between the device and one or more other devices.

5. The device of claim 4, wherein the communication comprises at least one of wireless fidelity (Wi-Fi) communication.

6. The device of claim 1, further comprising:
   a display configured to display a message for inquiring whether to cease the displaying of the data by the corresponding device to a user.

7. The device of claim 1, wherein the at least one processor is further configured to transmit a signal for controlling a power on or a power off of a communication module of the corresponding device.

8. The device of claim 1,
   wherein the at least one processor is further configured to identify a resource period occupied by at least one first device other than the device for a communication by the at least one first device, wherein the transceiver is further configured to:
communicate with the corresponding device in the resource period based on a communication power,
wherein the corresponding device is within a distance from the device, the distance being shorter than a distance between the device and the at least one first device, and
wherein the communication power is lower than a transmission power used for the communication by the at least one first device.

9. The device of claim 1, wherein the transceiver comprises an antenna comprising:
a substrate;
at least one radiator disposed in a surface of the substrate, configured to radiate signals to communicate with the corresponding device; and
a shielding body or a cavity contacting another surface of the substrate configured to shield the signals from interfering with a communication between other devices.

10. The device of claim 1, wherein the corresponding device comprises:
an antenna disposed in an inner surface of the corresponding device and configured to radiate signals to communicate with the device, wherein the inner surface of the corresponding device is operable to contact the device; and
a shielding component configured to shield the signals from interfering with a communication between other devices.

11. A method for operating a device comprising:
performing a communication of data to a corresponding device, wherein the data is displayed on a display of the corresponding device during the communication;
receiving, during the communication, a user input to cease the communication; and
transmitting, to the corresponding device, information for controlling the corresponding device to cease the communication in response to the user input,
wherein the displaying of the data by the corresponding device is ceased based on the information,
wherein the corresponding device is in a form of a cover that is capable of being folded, and
wherein the corresponding device comprises:
a first surface on which the display of the corresponding device is disposed, and
a second surface on which the device is mounted.

12. The method of claim 11, further comprising:
displaying an icon to control the displaying of the data by the corresponding device,
wherein the at least one processor is further configured to receive the user input through the displayed icon.

13. The method of claim 11, further comprising:
determining whether a remaining amount of battery of at least one of the device or the corresponding device is less than a threshold value; and
transmitting, to the corresponding device, information for controlling the corresponding device to cease the communication based on a determination that the remaining amount of battery of at least one of the device or the corresponding device is less than the threshold value.

14. The method of claim 11, wherein the corresponding device is within a distance from the device, the distance being shorter than a distance between the device and one or more other devices.

15. The method of claim 14, wherein the communication comprises at least one of wireless fidelity (Wi-Fi) communication.

16. The method of claim 11, further comprising:
displaying a message for inquiring whether to cease the displaying of the data by the corresponding device to a user.

17. The method of claim 11, further comprising:
transmitting a signal for controlling a power on or a power off of a communication module of the corresponding device.

18. The method of claim 11, further comprising:
identifying a resource period occupied by at least one first device other than the device for a communication by the at least one first device; and
communicating with the corresponding device in the resource period based on a communication power,
wherein the corresponding device is within a distance from the device, the distance being shorter than a distance between the device and the at least one first device, and
wherein the communication power is lower than a transmission power used for the communication by the at least one first device.

19. The method of claim 11, wherein an antenna of the device comprises:
a substrate;
at least one radiator disposed in a surface of the substrate, configured to radiate signals to communicate with the corresponding device; and
a shielding body or a cavity contacting another surface of the substrate configured to shield the signals from interfering with a communication between other devices.

20. The method of claim 11, wherein the corresponding device comprises:
an antenna disposed in an inner surface of the corresponding device and configured to radiate signals to communicate with the device, wherein the inner surface of the corresponding device is operable to contact the device; and
a shielding component configured to shield the signals from interfering with a communication between other devices.

* * * * *